1,745,398

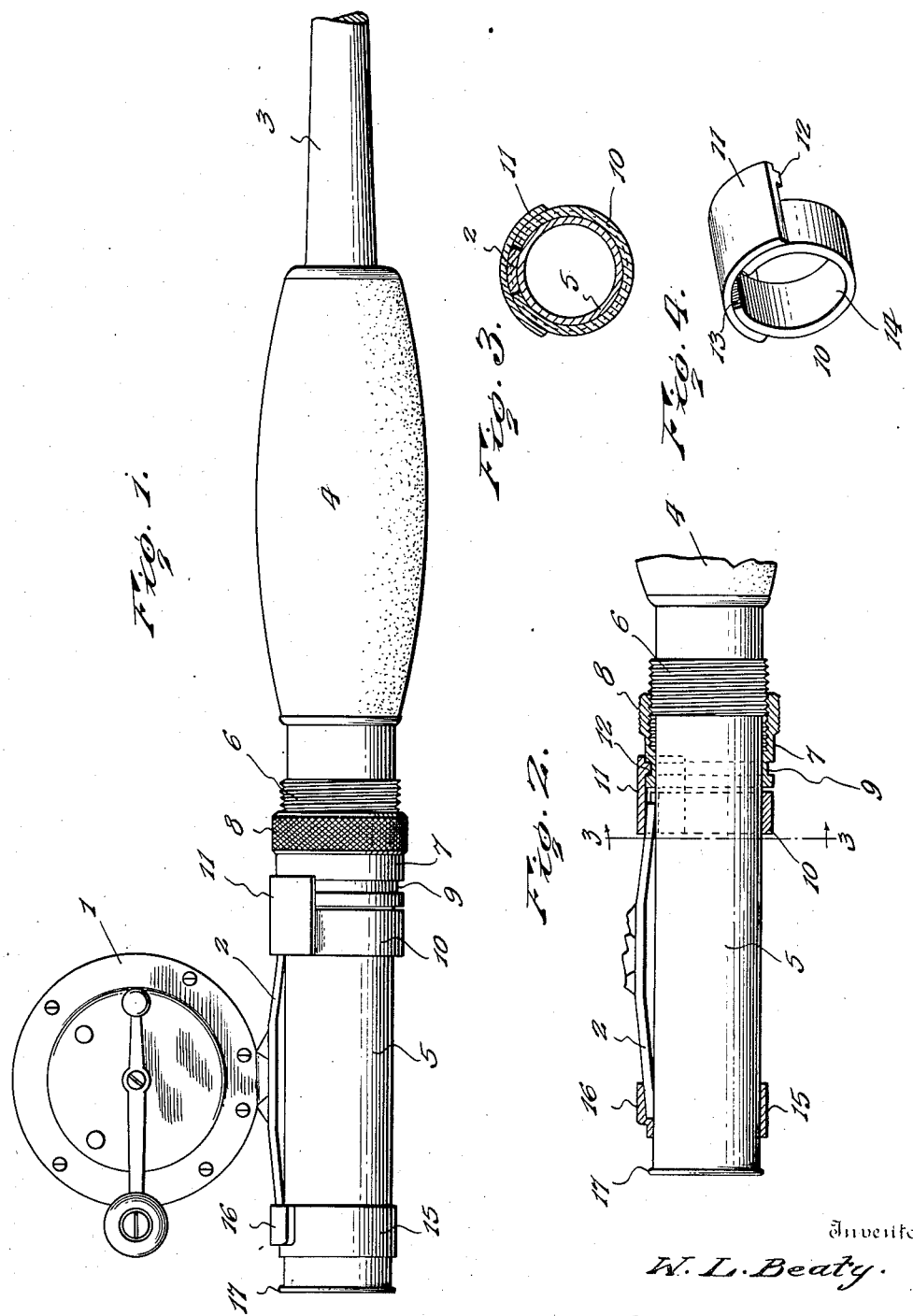
Feb. 4, 1930. W. L. BEATY 1,745,398
REEL SEAT FOR FISHING RODS
Filed May 9, 1928
Inventor
W. L. Beaty Patented Feb. 4, 1930

UNITED STATES PATENT OFFICE

WILBUR L. BEATY, OF BUTTE, MONTANA

REEL SEAT FOR FISHING RODS

Application filed May 9, 1928. Serial No. 276,447.

The present invention has for its object the provision of simple and efficient means whereby a reel may be secured upon a fishing rod and firmly held thereon but readily removed when desired, a particular object of the invention being to provide a mechanism which may be released from the reel base without the use of any extraneous tools. The invention also has for its object the provision of a reel base holder which may be easily manipulated to secure the reel upon the fishing rod without any binding action which will necessitate the use of extraneous tools when the reel is to be removed. The invention also provides a mechanism which may be readily assembled with the fishing rod handle but when assembled cannot be detached therefrom and lost. These stated objects, and other objects which will incidentally appear in the course of the following description, are attained in such a mechanism as is illustrated in the accompanying drawing, and the invention resides in certain novel features which will be particularly pointed out in the appended claims.

In the drawing:

Figure 1 is an elevation of a portion of a fishing rod and reel illustrating the application of the invention;

Fig. 2 is a view showing the handle barrel in elevation and the reel base securing means in longitudinal section;

Fig. 3 is a transverse section on the line 3—3 of Fig. 2, and

Fig. 4 is a perspective view of the reel base engaging hood.

The reel 1 may be of any approved form and is equipped with the usual base 2 consisting of a slightly bowed resilient plate. A portion of the fishing rod is indicated at 3 and the handle 4 may be secured upon the rod in the usual or any approved manner. 5 designates a barrel or tube of metal or other material which is permanently attached to the handle 4 when the structure is completed. In carrying out the present invention, an externally threaded sleeve 6 is sweated onto the barrel 5 adjacent one end thereof. There is also provided a collar or follower sleeve 7 which is externally threaded at one end and at said end is provided externally with a knurled annular rib 8 whereby it may be conveniently manipulated. The internal diameter of this follower ring is such that it may slide upon the barrel 5 and when assembled therewith have its internally threaded bore engaged with the threaded collar or ring 6, as clearly shown in the drawing. This follower ring or collar is provided with an external annular groove 9 and is adapted to cooperate with a hood or reel base engaging ring or collar 10. Said collar or hood 10 has a smooth bore so that it may slide readily upon the barrel 5 and at one side has an axially projecting flange or cap portion 11 provided on its inner face with a transverse rib 12 adapted to fit in the annular groove 9 of the follower sleeve. The end of the hood is intended to engage over the reel base 2 and clamp the same against the barrel 5, and to provide a seat or recess 13 for engaging the end of the reel base the construction illustrated particularly in Fig. 4 is convenient, efficient and inexpensive. This construction comprises a main split ring 14, upon the ends of which the cap 11 may be sweated or otherwise permanently attached so that one end edge of the cap may extend over the end of the reel base, as shown clearly in Fig. 2. In assembling the parts, the follower sleeve is moved laterally with respect to the hood so that the groove 9 will engage the rib 12, whereupon the follower and the hood are together slipped over the free smooth end of the barrel 5 and slid along the barrel until the threaded bore of the follower engages the threads of the ring or collar 6. The hood is thus swiveled to the follower so that it may slide along the barrel 5 without rotating around the barrel with the follower and the engagement of the sides of the recess 13 with the edges of the reel base 2 will hold the hood against rotation. After the follower and the hood have been thus assembled upon the barrel, a seat ring or collar 15 is slipped over the end of the barrel and is sweated or otherwise permanently attached thereto, this ring or collar having an offset portion 16 constituting a seat for one end of the reel base, as shown in Figs. 1 and 2. After the fixed seat ring has been secured in place, a ferrule or finishing collar 17 is sweated onto the end of the barrel to impart sightliness thereto and avoid any likelihood of the user of the device being cut by the sharp end of the barrel.

It will be obvious that if the follower sleeve 8 be rotated in one direction it will ride upon the barrel 5 toward the handle 4 and if rotated in the opposite direction it will ride away from the handle. Initially, the follower is nearer the handle and the hood 10 is spaced from the seat ring 15 a sufficient distance to permit the reel base 2 to be disposed upon the barrel with one end in engagement with the seat 16. After the reel base has been thus placed in position, the follower sleeve is rotated so as to ride toward the reel and thereby push the hood into engagement with the end of the reel base and over the same to secure it firmly upon the barrel 5. When the hood is pushed over the end of the reel base, it will firmly clamp the reel base to the fishing rod barrel but will not bind thereon so that the use of hammers, pries or other tools will be unnecessary when it is desired to remove the reel but reverse rotation of the follower sleeve will easily release the hood from the reel base. The device is simple in its construction and arrangement and efficient in use and may be readily applied to any fishing rod.

Having thus described the invention, I claim:

1. Means for securing a reel upon a fishing rod comprising a stationary seat to be engaged by one end of the reel base, a hood slidable toward and from the reel base to engage over the opposite end thereof, and a follower rotatably mounted and having swiveled engagement with the hood whereby rotation of the follower will cause it to move endwise with the hood to project the hood over the end of the reel base or retract it therefrom.

2. Means for the purpose set forth comprising a barrel, a fixed seat thereon, a follower rotatably mounted upon the barrel and having an external annular groove in one end, and a hood slidably mounted upon the barrel and having at one end a rib engageable in the groove of the follower whereby rotation of the follower will cause it to move endwise with the hood to project the hood over a reel base or retract it therefrom.

3. Means for the purpose set forth comprising a barrel having a threaded portion, a fixed seat on the barrel spaced from the threaded portion, a follower sleeve having a threaded bore engaged with the threaded portion of the barrel, and a hood swiveled to the follower and adapted to be moved endwise by rotation of the follower to be engaged over or withdrawn from a reel base.

4. Means for the purpose set forth comprising a hood engageable with the end of a reel seat and held against rotation thereby, and a follower engaged with the hood for relative rotation and held against relative axial movement whereby rotation of the follower will cause it to move endwise with the hood to project the follower over the reel base or retract it therefrom.

5. Means for the purpose set forth comprising a hood consisting of a split ring and a cap externally bridging the split in the ring whereby to extend over the end of a reel base received in the split, the cap being projected at one end axially from the ring, and a follower engaged with the projecting end of the cap for relative rotation and held against relative endwise movement whereby to project the hood over or retract it from the end of a reel base.

6. Means for the purpose set forth comprising a barrel, a threaded ring permanently secured on the barrel, a follower sleeve internally threaded at one end to engage the threaded sleeve and having a smooth bore at the other end whereby it may slidably engage the barrel and provided at said smooth bore end with an external annular groove, a hood slidably mounted upon the barrel and having a projecting portion of less circumferential extent than the main body of the hood, said projecting portion having an internal rib to engage the groove in the follower and the hood being constructed to engage over the end of a reel seat resting on the barrel and be held against rotation by the reel seat.

In testimony whereof I affix my signature.

WILBUR L. BEATY. [L. S.]